(12) United States Patent
Sprunk et al.

(10) Patent No.: US 9,912,771 B2
(45) Date of Patent: Mar. 6, 2018

(54) REAL TIME KEY COLLECTION IN DEVICE PROVISIONING

(71) Applicant: ARRIS Enterprises, Inc., Suwanee, GA (US)

(72) Inventors: Eric J. Sprunk, Carlsbad, CA (US); Tat Keung Chan, San Diego, CA (US); Xin Qiu, San Diego, CA (US); Jason A. Pasion, San Diego, CA (US); Oscar L. Jiang, Rosemead, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 725 days.

(21) Appl. No.: 14/251,958

(22) Filed: Apr. 14, 2014

(65) Prior Publication Data

US 2015/0296035 A1    Oct. 15, 2015

(51) Int. Cl.
| | |
|---|---|
| G06F 15/16 | (2006.01) |
| H04L 29/08 | (2006.01) |
| H04W 12/04 | (2009.01) |
| G06F 21/34 | (2013.01) |
| G06F 21/45 | (2013.01) |

(Continued)

(52) U.S. Cl.
CPC .............. *H04L 67/26* (2013.01); *G06F 21/34* (2013.01); *G06F 21/45* (2013.01); *G06F 21/6272* (2013.01); *H04L 67/1097* (2013.01); *H04W 12/04* (2013.01); *H04L 63/067* (2013.01)

(58) Field of Classification Search
CPC ... H04L 67/26; H04L 67/1097; H04L 63/067; G06F 21/6272; G06F 21/34; G06F 21/45; H04W 12/04
See application file for complete search history.

(56) References Cited

U.S. PATENT DOCUMENTS

| 5,544,246 A | * | 8/1996 | Mandelbaum ....... G06Q 20/341 |
| | | | 235/379 |
| 7,937,595 B1 | * | 5/2011 | Kumar ................... G06F 21/10 |
| | | | 345/519 |

(Continued)

FOREIGN PATENT DOCUMENTS

| CN | 101110419 B | 12/2010 |
| CN | 101454783 B | 7/2012 |

(Continued)

OTHER PUBLICATIONS

Krawczyk, H. et al., "HMAC: Keyed-Hashing for Message Authentication", Network Working Group Request for Comments: 2104, Feb. 1997.

(Continued)

*Primary Examiner* — Richard G Keehn
(74) *Attorney, Agent, or Firm* — Thomas A. Ward

(57) ABSTRACT

A method of pushing data from a client to a key collector, comprising preparing one or more SOC keys and one or more SOC IDs at a client, pushing the one or more SOC keys and one or more SOC IDs from the client to one or more key collectors, receiving an acknowledgement at the client from the one or more key collectors in response to pushing the one or more SOC keys and one or more SOC IDs to the key collectors, and installing the one or more SOC keys and one or more SOC IDs on a system-on-chip.

10 Claims, 5 Drawing Sheets

(51) Int. Cl.
*G06F 21/62* (2013.01)
*H04L 29/06* (2006.01)

(56) References Cited

U.S. PATENT DOCUMENTS

| | | | | |
|---|---|---|---|---|
| 2002/0020745 A1* | 2/2002 | Yap | ............ | G06Q 20/341 |
| | | | | 235/451 |
| 2004/0236680 A1* | 11/2004 | Luoffo | ............ | G06Q 20/10 |
| | | | | 705/39 |
| 2006/0282734 A1* | 12/2006 | Milne | ............ | G06F 21/35 |
| | | | | 714/742 |
| 2008/0044025 A1* | 2/2008 | Corndorf | ............ | H04L 9/0631 |
| | | | | 380/270 |
| 2009/0172401 A1* | 7/2009 | Cizas | ............ | G06F 21/76 |
| | | | | 713/169 |
| 2011/0107095 A1* | 5/2011 | Malzahn | ............ | G06F 21/10 |
| | | | | 713/168 |
| 2011/0113443 A1* | 5/2011 | Yu | ............ | H04N 7/1675 |
| | | | | 725/28 |
| 2011/0264435 A1* | 10/2011 | Jamnejad | ............ | G06F 11/261 |
| | | | | 703/28 |
| 2011/0264436 A1* | 10/2011 | Ni | ............ | G06F 11/3652 |
| | | | | 703/28 |
| 2012/0066517 A1* | 3/2012 | Vysogorets | ............ | G06F 21/34 |
| | | | | 713/193 |
| 2013/0145173 A1* | 6/2013 | Shablygin | ............ | G06F 21/34 |
| | | | | 713/185 |
| 2013/0212704 A1* | 8/2013 | Shablygin | ............ | G06F 21/6218 |
| | | | | 726/28 |
| 2014/0201518 A1* | 7/2014 | Yao | ............ | H04L 9/0891 |
| | | | | 713/155 |
| 2014/0282808 A1* | 9/2014 | Beals | ............ | H04N 21/435 |
| | | | | 725/133 |
| 2015/0113592 A1* | 4/2015 | Curtis | ............ | H04L 63/0823 |
| | | | | 726/2 |
| 2015/0113627 A1* | 4/2015 | Curtis | ............ | H04L 63/06 |
| | | | | 726/10 |

FOREIGN PATENT DOCUMENTS

| | | |
|---|---|---|
| CN | 101840486 B | 7/2013 |
| TW | 201017465 A | 5/2010 |
| TW | 201332331 A | 8/2013 |

OTHER PUBLICATIONS

Official Action, Re: Taiwan Application No. 104111988, dated Sep. 26, 2016.

* cited by examiner

REAL TIME KEY COLLECTION IN DEVICE PROVISIONING

TECHNICAL FIELD

The present disclosure relates to the field of provisioning a System-on-Chip (SOC) with keys and identity data, particularly a system for delivering the keys and identity data to a third party at or near the time they are installed on the SOC.

BACKGROUND

Many devices such as set-top boxes and mobile phones incorporate a System-on-Chip (SOC) to provide a computing platform upon which their operating system and/or applications can be run. A SOC can be a single chip that combines many aspects of a computer or electronic system, such as a processor, memory, and data interface. In some cases, SOCs can be more efficient than an assembly of separate general purpose hardware components, as SOCs can be configured to provide specific aspects or functionality needed by a particular device.

SOCs are generally manufactured by SOC vendors. SOC vendors often install keys and identity data on each SOC they produce. A SOC vendor can then provide the SOCs to device manufacturers, which then incorporate the SOCs into final device hardware.

A device manufacturer or other third party can obtain copies of the keys and identity data previously installed on the SOCs within each device by the SOC vendor. The device manufacturer or third party can use the copies of the keys and identity data to program, personalize, and/or encrypt data on each device that includes a SOC associated with the keys and identity data. By way of a non-limiting example, a mobile phone manufacturer can receive SOCs from a SOC Vendor, and incorporate those SOCs into mobile phones. The mobile phones can then be programmed or personalized using the keys and identity data installed on the SOC within each mobile phone, either at a device factory or after the mobile phones have been deployed in the field.

In some cases, a SOC vendor can maintain a list of the keys and identity data it installs on each SOC. The SOC vendor can then later provide the list of keys and identity data as a flat file to device manufacturers. However, the flat file often contains information about SOCs that are not relevant to individual device manufacturers. By way of a non-limiting example, a particular device manufacturer may have received a shipment of SOCs from the SOC vendor, but the flat file can contain information about the keys and identity data installed on all SOCs manufactured by the SOC vendor, not just the ones shipped to the device manufacturer.

Alternatively, the SOC vendor can capture and store copies of each key and identity data installed on every SOC, and then later provide copies of the keys and identity data for particular SOCs to a device manufacturer when those particular SOCs are provided to the device manufacturers. However, in these cases the SOC vendor may need to maintain copies of the keys and identity data until they are provided to a device manufacturer, which can lead to unwanted storage costs and/or liability issues if the storage fails and stored copies of the keys and identity data are lost or deleted.

SUMMARY

What is needed is a system for providing keys and identity data to device manufacturers or other third parties at the time the keys and identity data are installed on SOCs by a SOC vendor, such that a SOC vendor does not need to maintain copies of the keys and identity data for delivery to device manufactures at a later time. The keys and identity data can be pushed to one or more Key Collectors and/or Collector Central Facilities for storage in a database accessible by the device manufacturer, such that the device manufacturer can obtain copies of the keys and/or identity data from the Key Collectors and/or Collector Central Facilities.

In one embodiment, the present disclosure provides a method of pushing data from a client to a key collector, comprising preparing one or more SOC keys and one or more SOC IDs at a client, pushing the one or more SOC keys and one or more SOC IDs from the client to one or more key collectors, receiving an acknowledgement at the client from the one or more key collectors in response to pushing the one or more SOC keys and one or more SOC IDs to the key collectors, and installing the one or more SOC keys and one or more SOC IDs on a SOC.

In another embodiment, the present disclosure provides a method of pushing data from a client to a combined key collector and ID manager, comprising preparing one or more SOC keys at a client, pushing at least one of the one or more SOC keys from the client to a combined key collector and ID manager, receiving one or more SOC IDs at the client from the combined key collector and ID manager in response to pushing the at least one of one or more SOC keys to the combined key collector and ID manager, and installing the one or more SOC keys and one or more SOC IDs on a system on a chip.

In another embodiment, the present disclosure provides a method of receiving data pushed from a client to a key collector, comprising receiving one or more SOC keys and one or more SOC IDs at a key collector pushed from a client, sending an acknowledgement from the key collector to the client upon receipt of the one or more SOC keys and one or more SOC IDs, and storing the one or more SOC keys and one or more SOC IDs on a database at the key collector.

In yet another embodiment, the present disclosure provides a system comprising a client configured to install one or more SOC Keys and one or more SOC IDs on a SOC, and a key collector in communication with the client, wherein the key collector is configured to store the one or more SOC Keys and one or more SOC IDs, wherein the client is configured to push the one or more SOC Keys and one or more SOC IDs to the key collector, and the key collector is configured to send an acknowledgement to the client upon receipt of the one or more SOC Keys and one or more SOC IDs.

BRIEF DESCRIPTION OF THE DRAWINGS

Further details of the present invention are explained with the help of the attached drawings in which.

DETAILED DESCRIPTION

Figure 1:
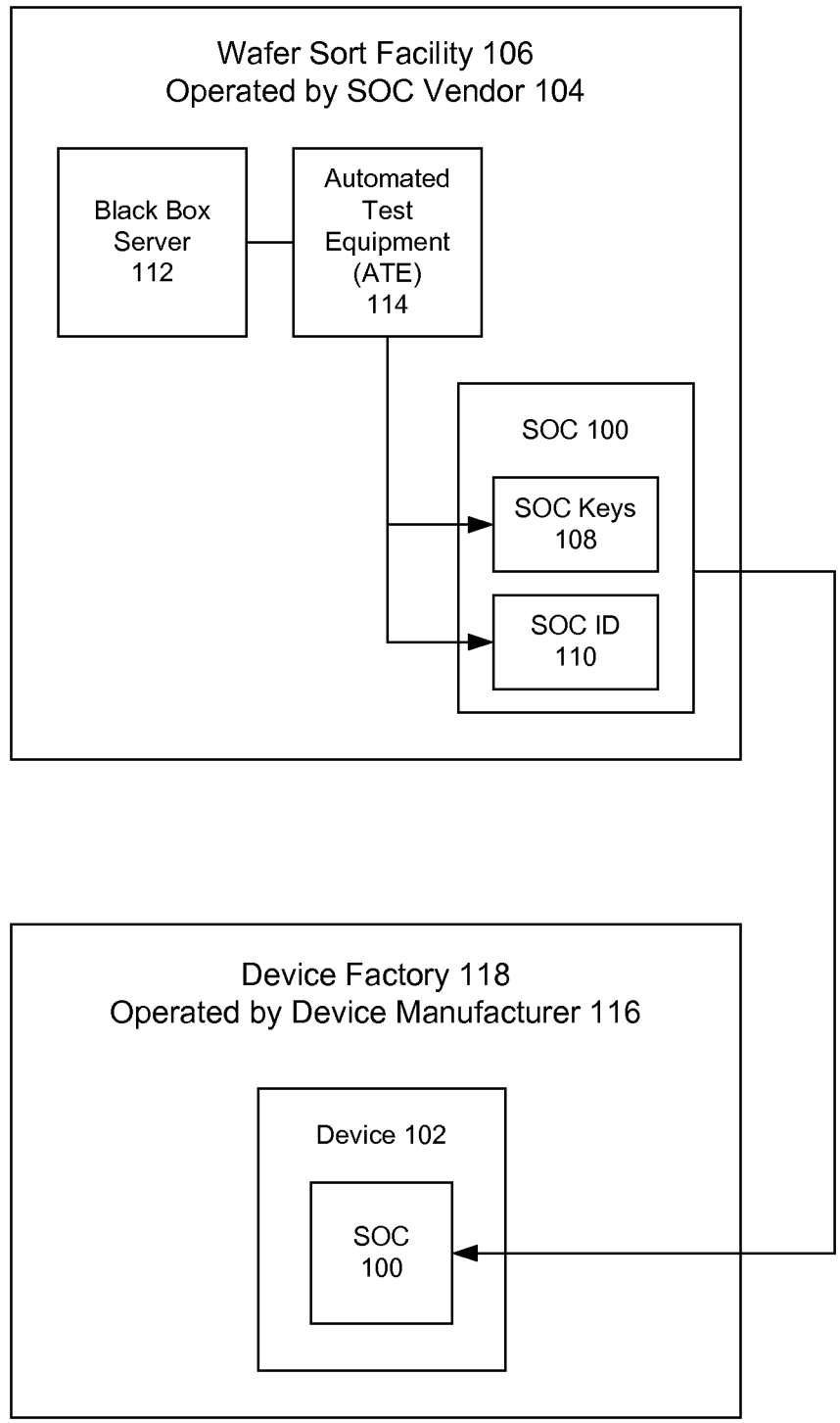
FIG. 1 depicts a system for installing data on a System-on-Chip (SOC) at a facility operated by a SOC Vendor, and for providing the SOC to a Device Manufacturer to be incorporated into a final device.

FIG. 1 depicts a system for installing data on a System-on-Chip (SOC) 100 at a facility operated by a SOC Vendor 104, and for providing the SOC 100 to a Device Manufacturer 116 to be incorporated into a final device 102.

A System-on-Chip (SOC) 100 can be an integrated circuit that comprises multiple elements of a computer or electronic system on a single chip. By way of a non-limiting example, a SOC 100 can comprise an application processor, graphics processor, memory, networking interface and/or other hardware in a single chip. As shown in FIG. 1, SOCs 100 can be incorporated into devices 102 such as set-top boxes, mobile phones, tablet computers, and other devices to provide the devices 102 with a computing platform on which applications or other software can be run. By way of a non-limiting example, an operating system and applications can be run on a smartphone via a SOC 100 in the smartphone.

SOCs 100 can be manufactured by SOC Vendors 104, which can operate facilities to provision each SOC 100 with one or more SOC Keys 108 and one or more SOC Identities (SOC IDs) 110. In some embodiments, the SOC Vendor 104 can provision SOCs 100 with SOC Keys 108 and SOC IDs 110 at a Wafer Sort Facility 106, using Black Box Server 112 and/or Automated Test Equipment (ATE) 114, as shown in FIG. 1. As will be discussed below with reference to FIG. 2, in some embodiments one or both of the Black Box Server 112 and ATE 114 can be referred to as a Client 200. After the SOCs 100 have been provisioned with SOC Keys 108 and SOC IDs 110, the SOCs 100 can be delivered to a Device Manufacturer 116, such that the SOCs 100 can be incorporated into devices 102 at a device factory 118 or other facility.

A SOC Key 108 can be a unique or global key that can be installed on a SOC 100. Once the SOC 100 has been incorporated into a device 102, other components can interact with the device 102 in specified ways if the other component has a copy of the SOC Key 108 installed on the device's SOC 100. In some embodiments, SOC Keys 108 can be installed on the SOC's One-Time-Programmable memory. One or more types of SOC Keys 108 can be installed on a SOC 100, such as a One Time Programmable Key (OTP Key), Joint Test Action Group Key (JTAG Key), or any other type of key.

An OTP Key can be a key installed on a SOC 100 that can be used to encrypt and decrypt unique personalization data provisioned onto the device 102 that incorporates the SOC 100. At the time a device is manufactured by a device manufacturer 116, or after the device 102 has been manufactured and has been deployed in the field, the device 102 can be provisioned with unique personalization data by the device manufacturer 116, or another third party such as a network operator or service provider. The personalization data can be used to uniquely identify the device 102, authenticate the device 102, allow communication with the device 102, protect content on the device 102, allow access to the device 102, and/or permit or disable other types of features on the device 102. The unique personalization data for a particular device 102 can be encrypted and decrypted using an OTP Key installed on that device's SOC 100. By way of a non-limiting example, personalization data for a particular device 102 can include a key pair of a public and private key, as well as one or more digital certificates, that can be used in a Public Key Infrastructure (PKI) system to identify and/or authorize the particular device 102, and an OTP Key installed on the particular device's SOC 100 can be used by the device manufacturer 116 or other third party that has a copy of the OTP Key to encrypt or decrypt the personalization data for the particular device 102.

A JTAG Key can be a key installed on a SOC 100 that can be used to open JTAG ports on a device 102 that incorporates the SOC 100. By way of a non-limiting example, a JTAG Key can be used to open a JTAG port on a device 102 incorporating the SOC 100 for programming, testing, or debugging the device's systems, such as software or firmware run by the SOC 100.

Each SOC 100 can be associated with one or more SOC IDs 110. Each SOC ID 110 can be a unique identifier for a particular SOC 100, such as a number, string of characters, serial number, or any other piece of data that can uniquely identify a particular SOC 100. By way of a non-limiting example, different SOCs 100, even of the same type or model, can have different SOC IDs 110 such that each individual SOC 100 can be identified through its SOC ID 110. In some embodiments each SOC 100 can be associated with a single SOC ID 110, while in other embodiments each SOC 100 can be associated with a multiple SOC IDs 110 of different types. As will be discussed below, each SOC ID 110 associated with a particular SOC 100 can be installed on the SOC 100, and SOC Keys 108 also associated with that particular SOC 100 can be linked to the SOC's SOC ID 110.

A Black Box Server 112 can be a server that stores SOC Keys 108 and/or SOC IDs 110, such that the SOC Keys 108 and/or SOC IDs 110 can be retrieved from a repository at the Black Box Server to be installed onto SOCs 100. In some embodiments, the Black Box Server 112 itself can generate SOC Keys 108 and/or SOC IDs 110 on the fly, or up front and then store them in memory for later retrieval. In other embodiments, a Black Box Server 112 can receive and store SOC Keys 108 or SOC IDs 110 generated by another component operated by the SOC Vendor 104 or a third party. By way of a non-limiting example, as shown in FIG. 2, in some embodiments a Key Generator 202 outside the Wafer Sort Facility 106 can generate SOC Keys 108 and provide them to the Black Box Server 112, and/or an ID Manager 204 within the Wafer Sort Facility 106 can generate and provide SOC IDs 110 to the Black Box Server 112.

Automated Test Equipment (ATE 114) can be configured to install SOC Keys 108 and SOC IDs 110 onto SOCs 100. The ATE 114 can obtain the SOC Keys 108 and SOC IDs 110 it installs on SOCs 100 from the Black Box Server 112. The ATE 114 can be in communication with the Black Box Server 112, such that it can request and receive SOC Keys 108 and/or SOC IDs 110 from the Black Box Server 112. In some embodiments, the Black Box Server 112 and ATE 114 can be directly connected. In alternate embodiments, data exchanged between the Black Box Server 112 and ATE 114 can pass through one or more intermediate servers, such as a cryptographic proxy server positioned between the Black Box Server 112 and ATE 114.

In some embodiments, the ATE 114 can generate and/or associate a SOC ID 110 with the one or more SOC Keys 108 it loads onto a SOC 100. By way of a non-limiting example, when the ATE 114 installs SOC Keys 108 on a SOC 100, it can retrieve a SOC ID 110 from a list or database on the ATE 114 or other component at the Wafer Sort Facility 106, associate the SOC ID 110 with the SOC Keys 108 installed on the SOC 100, install the SOC ID 110 on the SOC 100, and save the association between the SOC ID 110 and SOC Keys 108 on a list or database at the ATE 114 or other component at the Wafer Sort Facility 106.

Figure 2:
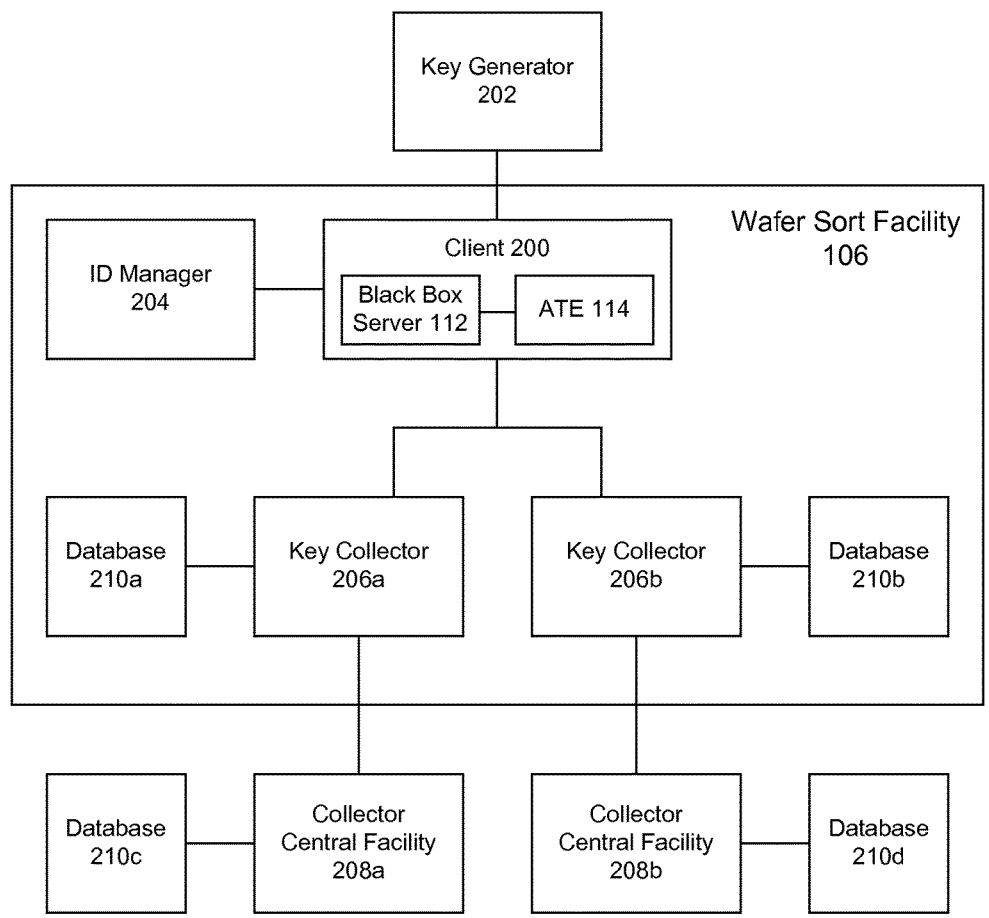
FIG. 2 depicts a system for pushing SOC Keys from a Client to one or more Key Collectors.

FIG. 2 depicts a system for pushing SOC Keys 108 from a Client 200 to one or more Key Collectors 206. A Client 200 can be either one or both of the Black Box Server 112 and ATE 114, such that the Client 200 can be configured to store and install SOC Keys 108 and SOC IDs 110 on SOCs 100.

In some embodiments, the Client 200 can obtain the SOC Keys 108 from a Key Generator 202 outside the Wafer Sort Facility 106. However, in other embodiments the Key Generator 202 can be absent, and the Client 200 can generate the SOC Keys 108 itself. By way of a non-limiting example, as mentioned with respect to FIG. 1, in some embodiments the Black Box Server 112 can generate SOC Keys 108.

In some embodiments the Client 200 can obtain SOC IDs 110 from an ID Manager 204 at the Wafer Sort Facility 106, however in other embodiments the ID Manager 204 can be absent and the Client 200 can obtain SOC IDs 110 from the Key Generator 202. In still other embodiments the Client 200 can generate the SOC IDs 110 itself.

Figure 3:
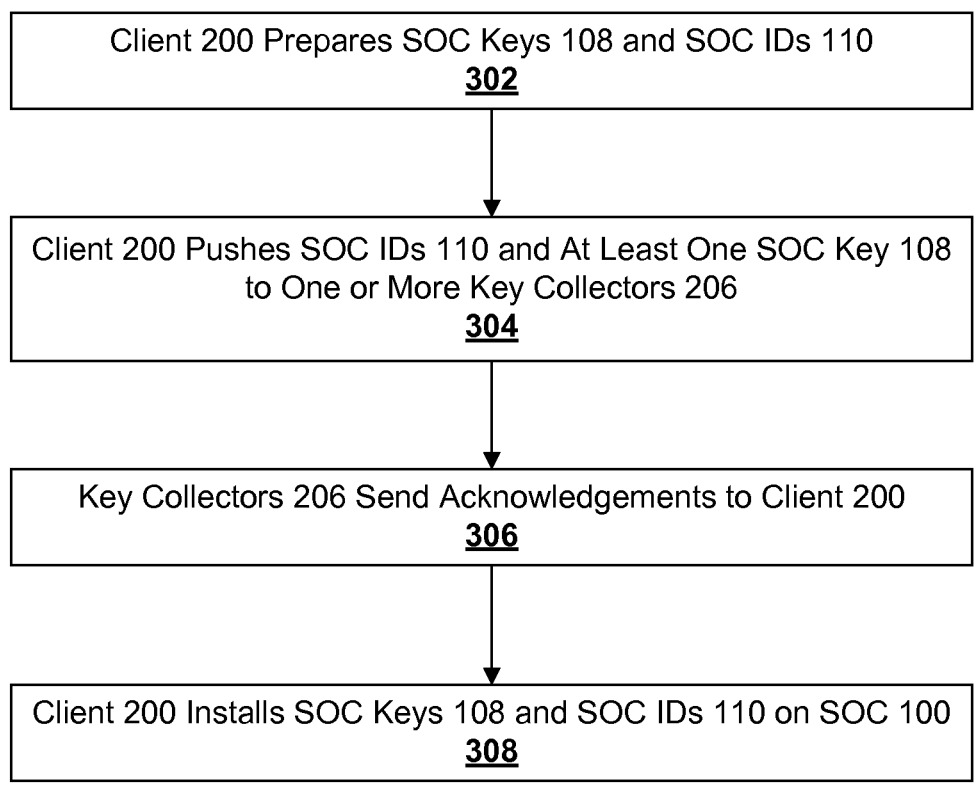
FIG. 3 depicts a first method for pushing SOC Keys and SOC IDs to one or more Key Collectors.
Figure 4:
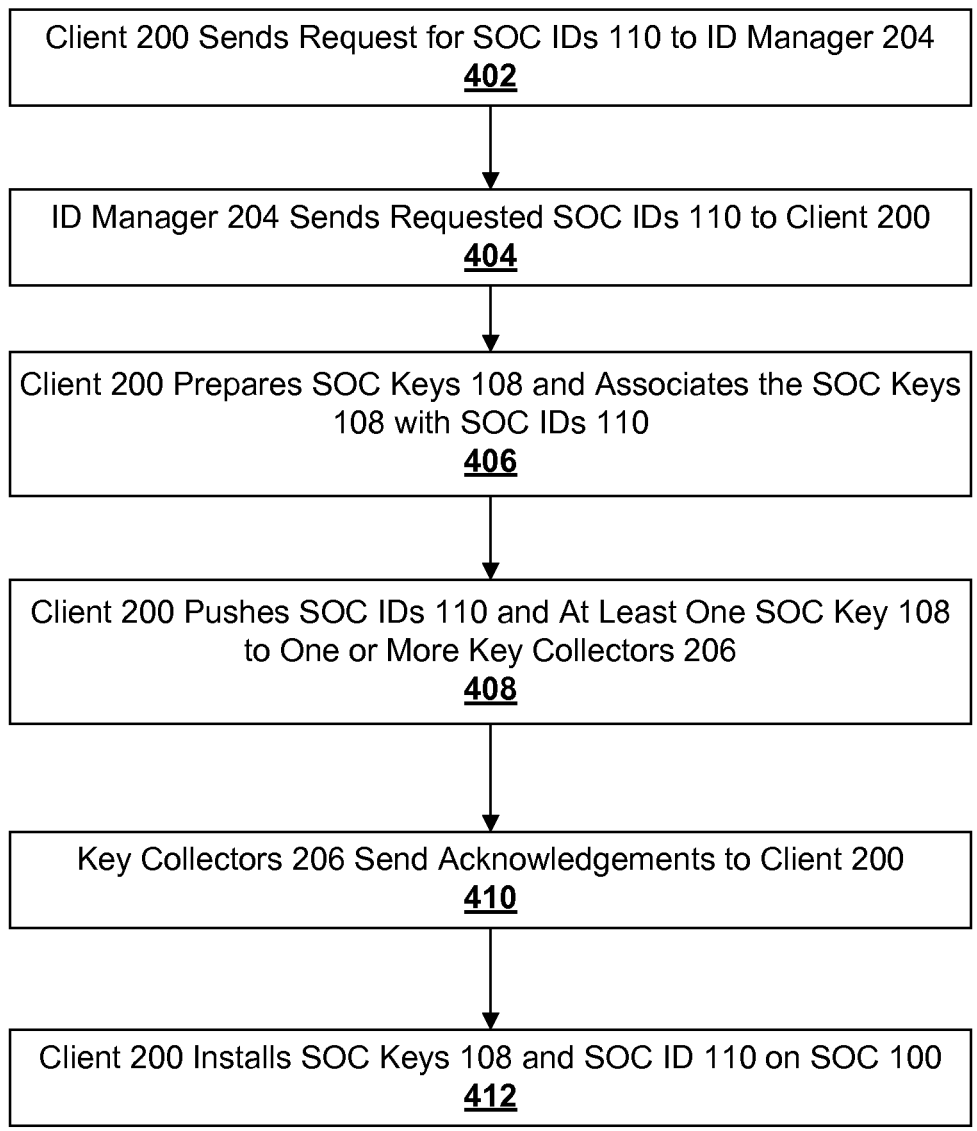
FIG. 4 depicts a second method for pushing SOC Keys and SOC IDs to one or more Key Collectors.
Figure 5:
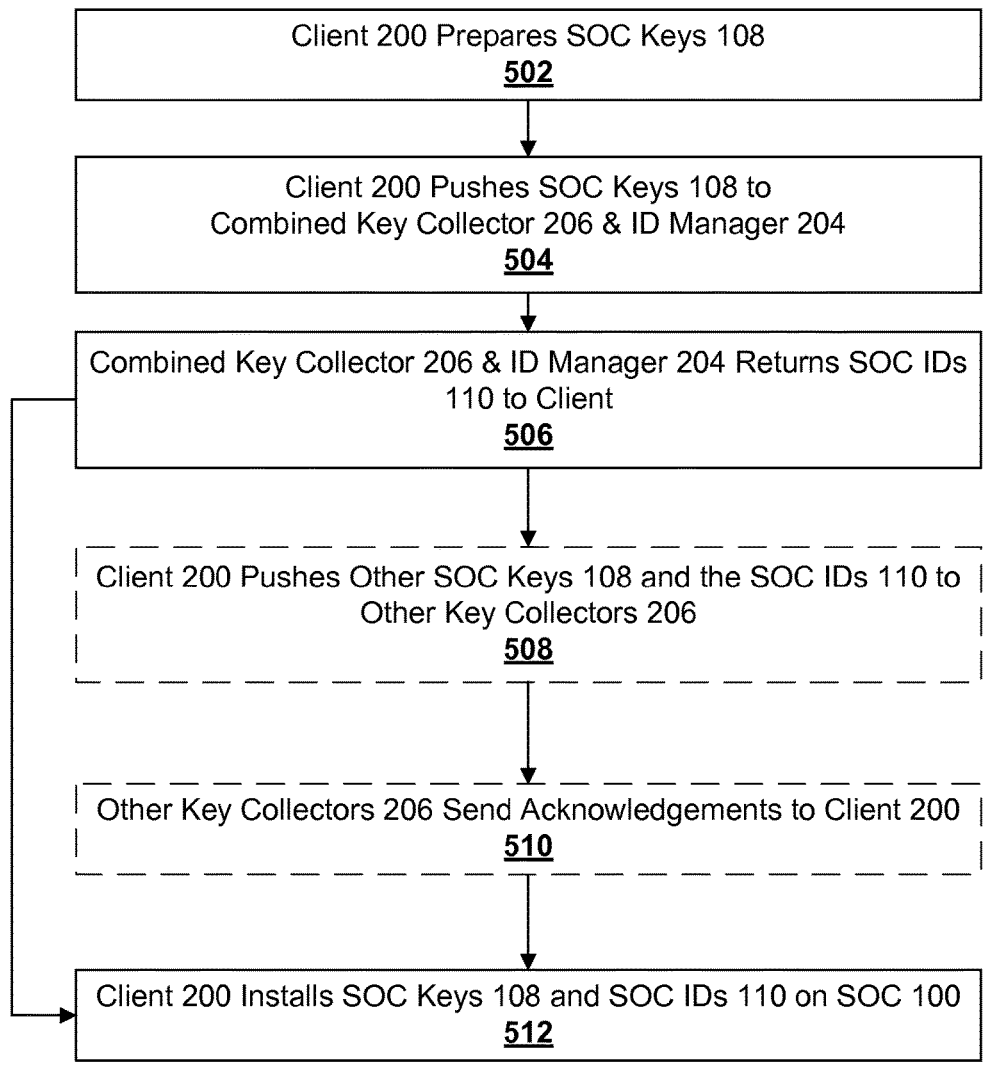
FIG. 5 depicts a third method for pushing SOC Keys and SOC IDs to one or more Key Collectors, in which one of the Key Collectors is also an ID Manager.

At or near the time the Client 200 installs SOC Keys 108 and SOC IDs 110 on a SOC 100, the Client 200 can push data about the SOC Keys 108 and SOC IDs 110 installed on that SOC 100 to one or more Key Collectors 206. FIGS. 3, 4, and 5 below depict exemplary methods for pushing SOC Keys 108 to one or more Key Collectors 206.

In some embodiments, a Key Collector 206 can be a server owned and operated by the party who has rights and interests to obtain one of more SOC Keys 108 from a SOC Vendor 104. By way of a non-limiting example, a Device Manufacturer 116 can install and operate a Key Collector 206 at a Wafer Sort Facility 106 to collect one of the OTP Keys and a JTAG Key. The Device Manufacturer 116 can use the collected OTP Key to encrypt its personalization data to be later provisioned to the device 102. The Device Manufacturer 116 can use the collected JTAG Key to facilitate hardware and software development, and/or in repair cases. At the same time, a network operator can install and operate a separate or additional Key Collector 206 at the Wafer Sort Facility 106 to collect a different OTP Key and a different JTAG Key. Similarly, the network operator can use the different OTP Key to encrypt its own personalization data for provisioning into the device 102. The network operator can also be developing software applications for the device and can use the collected JTAG Key in the development process.

In some embodiments, the Key Collectors 206 can be located in the same facility as the Client 200, such as the Wafer Sort Facility 106. In other embodiments, the Key Collectors 206 can be located in one or more different facilities. In some embodiments in which the Key Collectors 206 are located in the same facility as the Client, each Key Collector 206 can be linked to a separate Collector Central Facility 208 at a different location, such that copies of the SOC Keys 108 and SOC IDs 110 can be stored at a different location for data redundancy. Each of the Key Collectors 206 and/or Collector Central Facilities 208 can have one or more local databases 210 upon which copies of the SOC Keys 108 and SOC IDs 110 can be stored.

In some embodiments, the Client 200 and Key Collector 206 can share a pair of cryptographic keys, including an authentication key and an encryption key. The shared keys can be used to exchange data between the Client 200 and Key Collector 206, such as when SOC Keys 108 are pushed from the Client 200 to a Key Collector 206 as described below. Keys can be shared between the Client 200 and Key Collector 206 using a key exchange or key agreement algorithm, such as an authenticated Diffie-Hellman algorithm.

The authentication key can be a key configured to authenticate messages sent between the Client 200 and Key Collector 206. By way of a non-limiting example, the Client 200 and Key Collector 206 can share a symmetric key out-of-band, and then use a symmetric-based authentication algorithm such as hash-based message authentication code (HMAC) to determine an authentication code for any messages exchanged between the Client 200 and Key Collector 206 using the shared key. By way of another non-limiting example, an asymmetric algorithm, such as RSA, can be used to authenticate messages between the Client 200 and Key Collector 206 with public keys and/or digital certificates.

The encryption key can be used to encrypt and decrypt data, such as SOC Keys 108, sent between the Client 200 and Key Collector 206. By way of a non-limiting example, the Client 200 and Key Collector 206 can share a symmetric key out-of-band, and then use a symmetric encryption algorithm, such as AES, to encrypt and decrypt SOC Keys 108 pushed to the Key Collector 206 from the Client 200.

FIG. 3 depicts a first method for pushing SOC Keys 108 and SOC IDs 110 to one or more Key Collectors 206.

At step 302, the Client 200 can prepare one or more SOC Keys 108 and one or more SOC IDs 110 for a particular SOC 100. As discussed above with respect to FIG. 1, within the Client 200 the ATE 114 can request and retrieve a set of SOC Keys 108 and a SOC ID 110 from the Black Box Server 112. The ATE 114 can associate the received SOC Keys 108 with the receive SOC ID 110.

At step 304, the Client 200 can push the SOC IDs 110 and at least one of the SOC Keys 108 prepared during step 302 to one or more Key Collectors 206. In some embodiments or situations, the SOC Keys 108 and SOC IDs 110 can be pushed to a single Key Collector 206. In other embodiments or situations, different types of SOC Keys 108 can be pushed to different Key Collectors 206 along with the SOC IDs 110. By way of a non-limiting example, in FIG. 2 the Client 200 can push OTP Keys and the SOC IDs 110 to the Key Collector 206a, and can additionally push JTAG Keys and the SOC IDs 110 to the Key Collector 206b. Each Key Collector 206 that receives SOC Keys 108 and associated SOC IDs 110 can store the SOC Keys 108 and SOC IDs 110 on one or more local databases 210.

In some embodiments, each Key Collector 206 can send the SOC Keys 108 and SOC IDs 110 it receives from the Client 200 during step 304 to a Collector Central Facility 208 or other server. Each Collector Central Facility or other server can store copies of the SOC Keys 108 and SOC IDs 110 on its own local database 210 for data redundancy. In some embodiments, the Collector Central Facilities 208 or other servers can be located outside the Wafer Sort Facility 106, such that the SOC Keys 108 and SOC IDs 110 are stored in, and are retrievable from, multiple locations.

In some embodiments, each Key Collector 206 can verify that the SOC Keys 108 and SOC IDs 110 pushed to it by the Client 200 matches one or more verification parameters. In some embodiments, the verification parameters can be parameters specified by a SOC Vendor 104. By way of a non-limiting example, the SOC Vendor 104 can specify that only SOC Keys 108 and SOC IDs 110 that match certain verification parameters should be stored within the Key Collector's local database 210. In other embodiments, the verification parameters can be specified by one or more Device Manufacturers 116 that are expected to later retrieve SOC Keys 108 from the Key Collectors' databases 210, or from databases 210 at Collector Central Facilities 208 that store redundant copies of the SOC Keys 108 outside the Wafer Sort Facility 106. In still other embodiments, a central Key Collector 206 can be in communication with more than one SOC Vendor 104, such that multiple SOC Vendors 104 can push SOC Keys 108 and/or SOC IDs 110 to the same Key Collector 206. In these embodiments, the central Key Collector 206 can compare pushed SOC Keys 108 and/or SOC IDs 110 to verification parameters from one or more SOC Vendors 104 or Device Manufacturers 116.

One verification parameter can be a SOC Key Type. The SOC Key Type can indicate an expected format for a SOC Key 108, such as an expected file length, file type, file format, and/or any other attribute. By way of a non-limiting example, the SOC Key Type can specify that SOC Keys 108 received by a particular Key Collector 206 should be OTP Keys, such that any JTAG Keys received by the Key Collector 206 can be rejected. By way of another non-limiting example, the SOC Key Type can specify that received SOC Keys 108 should be JTAG Keys of a certain length, and SOC Keys 108 of different lengths can be rejected by the Key Collector 206 even if they are JTAG Keys.

Another verification parameter can be a SOC ID Type. The SOC ID Type can indicate an expected format for one or more SOC IDs 110, such as an expected file length, file type, file format, and/or any other attribute. SOC IDs 110 received by the Key Collector 206 during step 304 that do not match the SOC ID Type can be rejected by the Key Collector 206. By way of a non-limiting example, when the SOC ID Type specifies that SOC IDs 110 should have a certain length, any SOC ID 110 received by the Key Collector 206 that has a different length than the length specified in the SOC ID Type can be rejected by the Key Collector 206. By way of another non-limiting example, in some embodiments or situations a SOC Vendor 104 can specify that a single SOC Key 108 be associated with multiple SOC IDs 110 and the SOC ID Type can describe the expected attributes of each type of expected SOC ID 110, such that the SOC ID Type can be used to verify that each type of expected SOC ID 110 was received and each matches the attributes described by the SOC ID Type.

At step 306, each Key Collector 206 that received pushed SOC Keys 108 and SOC IDs 110 during step 304 can send an acknowledgement to the Client 200. In some embodiments, the acknowledgement can be sent if the pushed SOC Keys 108 and SOC IDs 110 matched specified verification parameters. In some embodiments, the Key Collector 206 can send a rejection message to the Client 200 if the pushed SOC Keys 108 and/or SOC IDs 110 did not match the verification parameters and were rejected.

At step 308, after the Client 200 has received the Key Collector's acknowledgement that it received the pushed SOC Keys 108 and SOC IDs 110, the Client 200 can program the SOC Keys 108 and SOC IDs 110 into the SOC 100. As discussed above, the SOC Keys 108 and SOC IDs 110 can be loaded onto the SOC 100, such that the SOC 100 is ready to be provided to a Device Manufacturer 116 for incorporation into a final device 102. In some embodiments, if the Client 200 has not received an acknowledgement from the Key Collector 206 or has received a rejection message from the Key Collector 206 indicating that the pushed SOC Keys 108 and/or SOC IDs 110 did not match one or more verification parameters, the Client 200 can retry step 304 by pushing the same SOC Keys 108 and SOC IDs 110 to the Key Collector 206 again, or it can return to step 302 and prepare different SOC Keys 108 and SOC IDs 110 to be pushed to the Key Collector 206 and installed on the SOC 100 if verified by the Key Collector 206. After the SOCs 100 have been programmed with SOC Keys 108 and SOC IDs 110, the SOCs 100 can be provided to device manufacturers 116 for integration into devices 102.

In some embodiments, the process of FIG. 3 can be followed in order. In alternate embodiments, step 308 can be performed before step 304, such that the Client 200 can program the SOC Keys 108 and SOC ID 110 onto the SOC 100 prior to pushing the SOC Keys 108 to one or more Key Collectors 206 and receiving an acknowledgement from the Key Collectors 206. In these alternate embodiments, the Client 200 can repeat step 304 until the SOC Keys 108 and SOC IDs 110 are successfully pushed to the Key Collectors 206 and an acknowledgement is received from the Key Collectors 206, to ensure that the Key Collectors 206 have copies of the SOC Keys 108 and SOC IDs 110 already programmed into the SOC 100.

FIG. 4 depicts a second method for pushing SOC Keys 108 and SOC IDs 110 to one or more Key Collectors 206. In this method, the Client 200 can be in communication with an ID Manager 204 that generates and/or manages SOC IDs 110.

At step 402, the Client 200 can send a request for one or more SOC IDs 110 to the ID Manager 204.

At step 404, the ID Manager 204 can generate SOC IDs 110 or retrieve previously-generated SOC IDs 110 from a database. The ID Manager 204 can then send the generated or retrieved SOC IDs 110 to the Client 200 in response to the Client's request for SOC IDs 110.

At step 406, the Client 200 can retrieve or generate one or more SOC Keys 108, and can associate the SOC Keys 108 with the SOC IDs 110 received from the ID Manager 204. By way of a non-limiting example, in some embodiments the Black Box Server 112 can generate OTP Keys based on the SOC IDs 110 received from the ID Manager 204 during step 404. In other embodiments, the Black Box Server 112 can generate OTP Keys, JTAG Keys, or any other type of SOC Key 108 on demand without basing them on a specific SOC ID 110. In still other embodiments, the Client 200 can retrieve SOC Keys 108 from a database of SOC Keys 108 previously generated by the Black Box Server 112, or receive the SOC Keys 108 from another component, such as a Key Generator 202.

At step 408, the Client 200 can push the SOC IDs 110 and at least one of the SOC Keys 108 associated with one another during step 406 to one or more Key Collectors 206. As discussed above with respect to FIG. 3, the SOC Keys 108 and SOC IDs 110 can be pushed to a single Key Collector 206, or different Key Collectors 206 that receive different types of SOC Keys 108. The receiving Key Collectors 206 can store the pushed SOC Keys 108 and SOC IDs 110 in one or more local databases 210. As with FIG. 3, each Key Collector 206 can send the SOC Keys 108 and SOC IDs 110 it receives from the Client 200 during step 408 to a Collector Central Facility 208 or other server. Each Collector Central Facility or other server can store copies of the SOC Keys 108 and SOC IDs 110 on its own local database 210 for data redundancy.

At step 410, each Key Collector 206 that received pushed SOC Keys 108 and SOC IDs 110 during step 408 can send an acknowledgement to the Client 200. As discussed above with respect to FIG. 3, in some embodiments the Key Collectors 206 can compare the pushed SOC Keys 108 and/or SOC IDs 110 against one or more verification parameters, such as SOC Key Type and SOC ID Type parameters, and send the acknowledgement to the Client 200 if the pushed data is verified. If the pushed data is not verified, the Key Collector 206 can return a rejection message to the Client 200.

At step 412, after the Client 200 has received the Key Collector's acknowledgement that it received the pushed SOC Keys 108 and SOC IDs 110, the Client 200 can program the SOC Keys 108 and SOC IDs 110 into the SOC 100. In some embodiments, if the Client 200 has not received an acknowledgement from the Key Collector 206 or has received a rejection message from the Key Collector 206 indicating that the pushed SOC Keys 108 and/or SOC IDs 110 did not match one or more verification parameters, the Client 200 can retry step 408 by pushing the same SOC Keys 108 and SOC IDs 110 to the Key Collector 206 again, or it can return to steps 402-406 to prepare different SOC Keys 108 and SOC IDs 110 to be pushed to the Key Collector 206 and installed on the SOC 100 if verified by the Key Collector 206. After the SOCs 100 have been programmed with SOC Keys 108 and SOC IDs 110, the SOCs 100 can be provided to device manufacturers 116 for integration into devices 102.

In some embodiments, the process of FIG. 4 can be followed in order. In alternate embodiments, step 412 can be performed before step 408, such that the Client 200 can program the SOC Keys 108 and SOC ID 110 onto the SOC 100 prior to pushing the SOC Keys 108 to one or more Key Collectors 206 and receiving an acknowledgement from the Key Collectors 206. In these alternate embodiments, the Client 200 can repeat step 408 until the SOC Keys 108 and SOC IDs 110 are successfully pushed to the Key Collectors 206 and an acknowledgement is received from the Key Collectors 206, to ensure that the Key Collectors 206 have copies of the SOC Keys 108 and SOC IDs 110 already programmed into the SOC 100.

FIG. 5 depicts a third method for pushing SOC Keys 108 and SOC IDs 110 to one or more Key Collectors 206, in which one of the Key Collectors 206 is also an ID Manager 204. In some embodiments, a Key Collector 206 can be combined with the ID Manager 204, such that the combined Key Collector 206 and ID Manager 204 can generate and manage SOC IDs 110 as well as receiving SOC Keys 108 pushed to it by the Client 200.

At step 502, the Client 200 can prepare one or more SOC Keys 108 to be installed on a particular SOC 100. In some embodiments, as discussed above with respect to FIG. 1, the Client 200 can prepare SOC Keys 108 by having the ATE 114 request and retrieve a set of SOC Keys 108 from the Black Box Server 112. The Black Box Server 112 can have generated the SOC Keys 108, or obtained them from another component such as the Key Generator 202.

At step 504, the Client 200 can push one or more of the SOC Keys 108 prepared during step 502 to the combined Key Collector 206 and ID Manager 204. In some embodiments, if the combined Key Collector 206 and ID Manager 204 is configured to collect a specific type of SOC Key 108, such as OTP Keys or JTAG Keys, the Client 200 can push the SOC Keys 108 matching that type to the combined Key Collector 206 and ID Manager 204. By way of a non-limiting example, when the combined Key Collector 206 and ID Manager 204 is configured to collect OTP Keys, the Client 200 can push OTP Keys to the combined Key Collector 206 and ID Manager 204 during step 504.

At step 506, the combined Key Collector 206 and ID Manager 204 can retrieve and assign a SOC ID 110 to the SOC Keys 108 pushed to it from the Client 200. The combined Key Collector 206 and ID Manager 204 can then send the assigned SOC ID 110 to the Client 200 in response to the pushed SOC Keys 108.

The combined Key Collector 206 and ID Manager 204 can store the SOC Keys 108 pushed to it during step 504 and/or the SOC ID 110 it sent to the Client 200 during step 506 in a local database 210. It can additionally send the SOC Keys 108 and SOC IDs 110 to a Collector Central Facility 208 to be stored in a separate database 210.

In some embodiments, similar to the verification procedures discussed above with respect to FIGS. 3 and 4, the combined Key Collector 206 and ID Manager 204 can compare the pushed SOC Keys 108 one or more verification parameters, such as a SOC Key Type, and send a SOC ID 110 to the Client 200 during step 506 if the pushed SOC Keys 108 are verified. If the pushed SOC Keys 108 are not verified, the combined Key Collector 206 and ID Manager 204 can return a rejection message to the Client 200 during step 506 instead of sending a SOC ID 110 back to the Client in response to the pushed SOC Keys 108.

At step 508, if other Key Collectors 206 besides the combined Key Collector 206 and ID Manager 204 are present within the system and are configured to collect different types of SOC Keys 108 than the combined Key Collector 206 and ID Manager 204, the Client 200 can push the other types of SOC Keys 108 and the SOC ID 110 to those other Key Collectors 206. By way of a non-limiting example, if the combined Key Collector 206 and ID Manager 204 is configured to receive OTP Keys pushed from the Client 200 during step 504, during step 508 the Client 200 can push JTAG Keys to a different Key Collector 206 configured to collect JTAG Keys, along with the SOC IDs received by the Client 200 during step 506. The different Key Collectors 206 can store the received SOC Keys 108 and SOC IDs 110 in local databases 210, and can send copies of the SOC Keys 108 and SOC IDs 110 to Collector Central Facilities 208 for storage in their databases 210.

At step 510, the other Key Collectors 206 can send an acknowledgement back to the Client 200 after receiving the sub-set of SOC Keys 108. As discussed above, in some embodiments the Key Collectors 206 can compare the pushed SOC Keys 108 and/or SOC IDs 110 against one or more verification parameters, such as SOC Key Type and SOC ID Type parameters, and send an acknowledgement to the Client 200 if the pushed data is verified. If the pushed data is not verified, the Key Collector 206 can return a rejection message to the Client 200.

In alternate embodiments, steps 508 and 510 can be absent, such as if only one Key Collector 206 is present in the system. By way of a non-limiting example, in embodiments in which a single Key Collector 206 is present that is configured to collect all types of SOC Keys 108, and that Key Collector 206 is also the ID Manager 204, the entire set of SOC Keys 108 can be pushed to the combined Key Collector 206 and ID Manager 204 during step 504, and the combined Key Collector 206 and ID Manager 204 can send SOC IDs 110 back to the Client during step 506.

At step 512, the Client 200 can program the SOC Keys 108 and SOC IDs 110 into a SOC 100. After the SOCs 100 have been programmed with SOC Keys 108 and SOC IDs 110, the SOCs 100 can be provided to device manufacturers 116 for integration into devices 102.

In some embodiments, the process of FIG. 5 can be followed in order. In alternate embodiments, step 512 can be performed before step 508, such that the Client 200 can program the SOC Keys 108 and SOC ID 110 onto the SOC 100 prior to pushing SOC Keys 108 to one or more Key Collectors 206 that are not combined with the ID Manager and receiving an acknowledgement from those Key Collectors 206. In these alternate embodiments, the Client 200 can repeat step 508 until the SOC Keys 108 and SOC IDs 110 are successfully pushed to the Key Collectors 206 and an acknowledgement is received from the Key Collectors 206, to ensure that the Key Collectors 206 have copies of the SOC Keys 108 and SOC IDs 110 already programmed into the SOC 100.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed:

1. A method of pushing data from a client to a key collector, comprising:
    preparing one or more SOC keys and one or more SOC IDs at a client, wherein the client comprises a Set Top Box;
    pushing said one or more SOC keys and one or more SOC IDs from said client to one or more key collectors;
    receiving an acknowledgement at said client from said one or more key collectors in response to pushing said one or more SOC keys and one or more SOC IDs to said key collectors; and
    installing said one or more SOC keys and one or more SOC IDs on a system-on-chip, wherein the one or more SOC IDs identify one or more SOCs.

2. The method of claim 1, further comprising: requesting said one or more SOC IDs from an ID Manager; and receiving said one or more SOC IDs at said client from said ID Manager.

3. The method of claim 1, wherein said one or more SOC keys are generated by a server within said client.

4. The method of claim 1, wherein said one or more SOC keys are provided to said client from a key generator.

5. The method of claim 1, wherein said client and said key collector are in direct communication and located within a common facility.

6. The method of claim 1, wherein said client sends SOC keys to different ones of said one or more key collectors depending on the SOC key's type.

7. The method of claim 6, wherein one type of SOC key is a one-time programmable key.

8. The method of claim 6, wherein one type of SOC key is a JTAG key.

9. The method of claim 1, wherein data exchanged between said client and said key collector is authenticated by an authentication key shared between said client and said key collector.

10. The method of claim 1, wherein data exchanged between said client and said key collector is encrypted with an encryption key shared between said client and said key collector.

* * * * *